United States Patent [19]
Dunn

[11] Patent Number: 5,322,311
[45] Date of Patent: Jun. 21, 1994

[54] BICYCLE MUD GUARD

[76] Inventor: Christopher J. Dunn, P.O. Box 2641, San Rafael, Calif. 94912

[21] Appl. No.: 788,474

[22] Filed: Nov. 6, 1991

[51] Int. Cl.⁵ .................................................. B62B 9/16
[52] U.S. Cl. ...................... 280/152.1; D12/186; 224/32 A; 280/152.3; 280/848; 280/852; 293/105; 293/117
[58] Field of Search ............... 280/152.1, 152.2, 152.3, 280/848, 847, 154, 851, 852, 158.1, 160.1; 293/105, 117; 224/32 A, 30 R, 32 R, 39; 403/344; 24/270; D12/186

[56] References Cited

U.S. PATENT DOCUMENTS

| D. 316,995 | 5/1991 | Kowalski | D12/186 |
| D. 320,590 | 10/1991 | Dunn | 280/152.3 |
| 1,189,534 | 7/1916 | Bresler | 280/160.1 |
| 3,023,027 | 2/1962 | Franciscus | 293/117 |
| 3,305,234 | 2/1967 | Cline et al. | 24/270 |

FOREIGN PATENT DOCUMENTS

| 88324 | 9/1983 | European Pat. Off. | 280/851 |
| 470354 | 9/1914 | France | 224/39 |
| 2610278 | 8/1988 | France | 280/152.1 |
| 109467 | 6/1984 | Japan | 280/847 |
| 28292 | 10/1917 | Norway | 224/39 |
| 90036 | 7/1921 | Switzerland | 224/39 |
| 612680 | 11/1948 | United Kingdom | 280/152.1 |
| 794714 | 5/1958 | United Kingdom | 280/852 |
| 2114075 | 8/1983 | United Kingdom | 280/851 |

Primary Examiner—Eric D. Culbreth
Attorney, Agent, or Firm—Owen, Wickersham & Erickson

[57] ABSTRACT

A mud guard adapted for attachment to the seat of a bicycle comprises an elongated semi-rigid body adapted to cantilever rearwardly from the seat post over the bicycle rear wheel. The body has a forward section comprising a pair of spaced apart, clamping jaw portions, each jaw portion being adapted to extend around one side of the seat post and having a forwardly projecting end portion. A locking fastener extends through the end portions to clamp them together around the post. At the rear end of the body is a yieldable extension member which is bendable when engaged and serves as a shock absorber to prevent excessive stresses on clamping jaw portions.

5 Claims, 3 Drawing Sheets

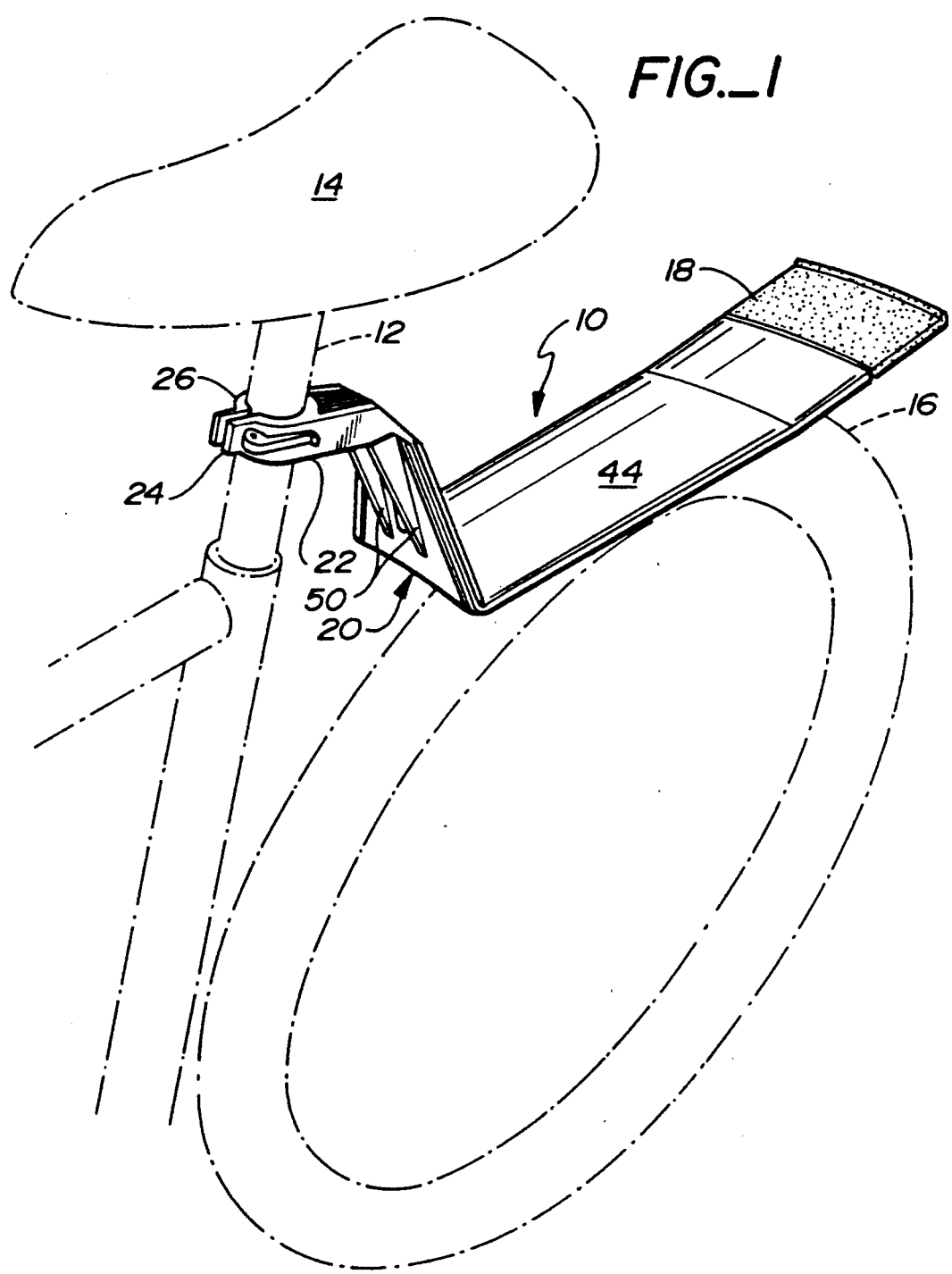
FIG._1

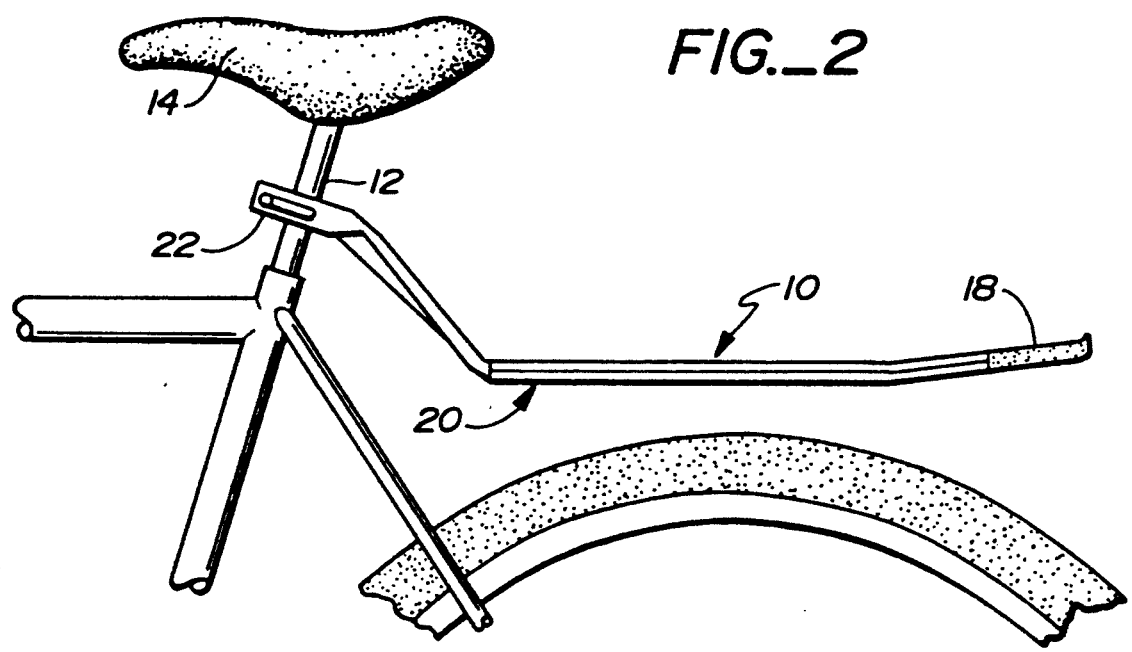
FIG._2
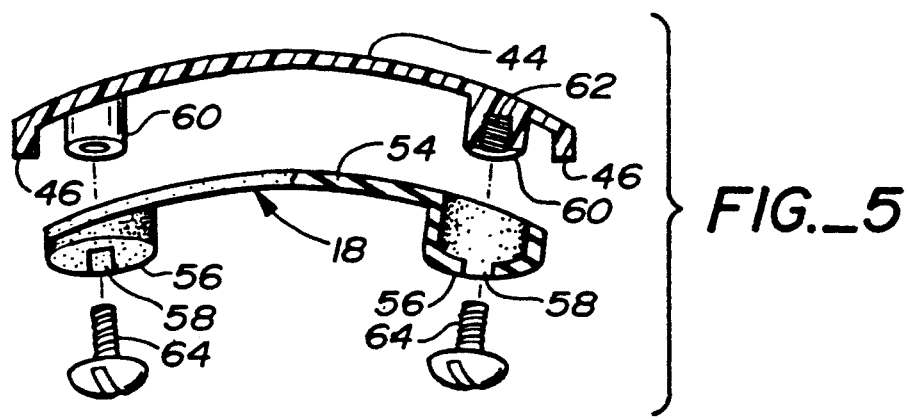
FIG._5

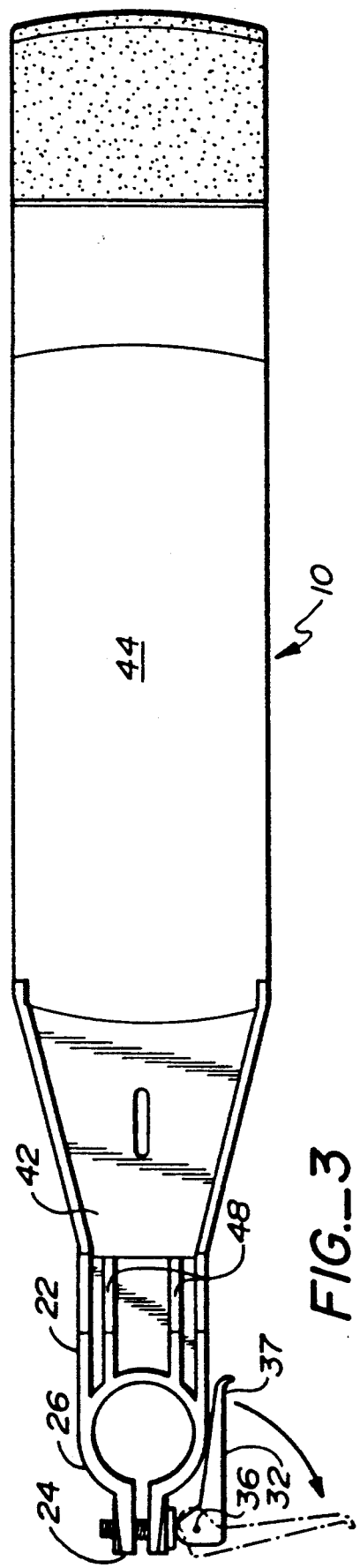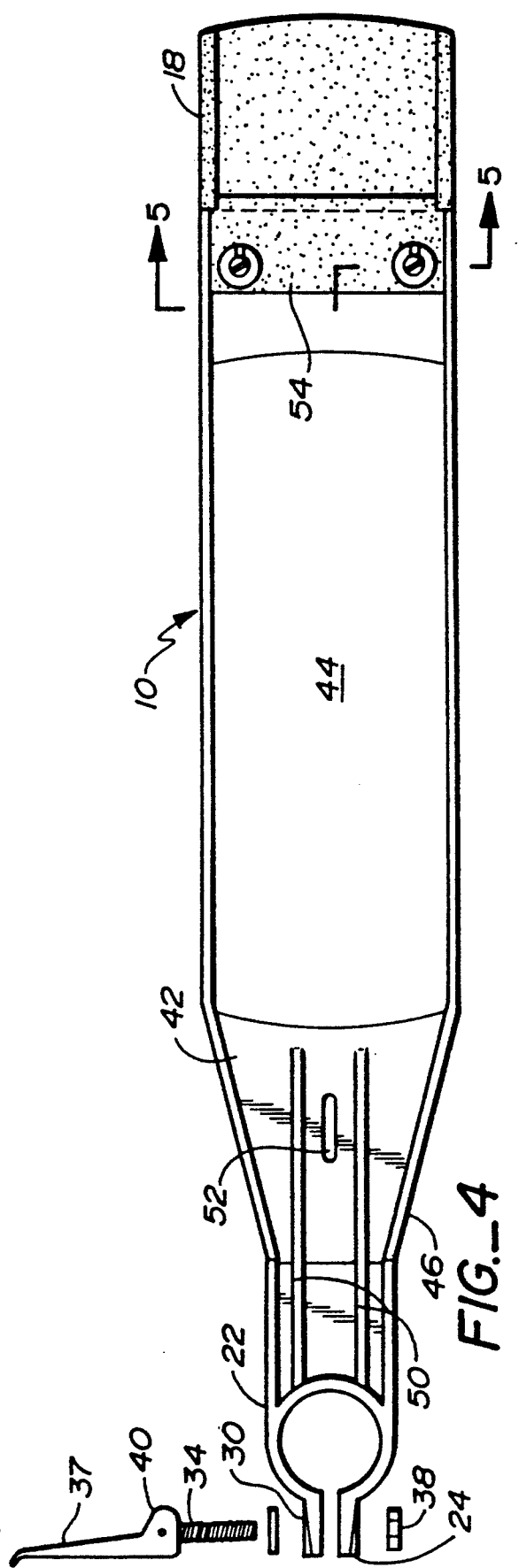

BICYCLE MUD GUARD

This invention relates to an improved mud or splash guard adapted for attachment to a bicycle.

BACKGROUND OF THE INVENTION

Bicycles have previously been equipped with arcuate fenders or wheel guards, usually made of metal and attached by means of radial arms to the hub of the wheel. More recently, the conventional "10-speed" and so called "mountain" bicycles are usually made with no fenders or guards in order to reduce weight. However, in many instances, particularly where the bicycle is ridden on unpaved trails and the like, some form of barrier is required over the rear wheel to prevent mud and water from splashing up on the rider.

A desireable form of splash barrier or mud guard is one which is light, yet strong and quickly and easily attachable to the bicycle seat post. Once attached, the barrier is cantilevered from the seat post and extends over the rear tire of the bicycle. One problem with earlier attempts to perfect such a barrier device was that often extraneous forces which were inadvertantly applied to the outer end of the rigid barrier resulted in excessive stress and possible failure of the attachment means at its inner end. Thus, it became necessary to reduce the effects of such forces on the outer end of the barrier.

It is therefore a general object of the present invention to solve the aforesaid problems by providing a mud or splash guard that is light in weight and yet strong and durable.

Another object of the invention is to provide a bicycle mud guard that cantilevers rearwardly from the bicycle seat post and has a yieldable end member which reduces the shock of any inadvertant forces on the outer end of the splash guard and resultant stresses on its attachment means.

Still another object of the invention is to provide a splash guard for the rear wheel of a bicycle that can be quickly and easily attached to the bicycle seat post and is adjustable on it.

SUMMARY OF THE INVENTION

In accordance with the principles of the invention a bicycle mud or splash guard is provided which is preferably molded as a one piece unit from a suitable plastic material which is light and durable. The mud guard has an elongated shape with a head end portion forming a pair of jaws that fit around a standard bicycle seat post. The jaws are slightly flexible and have projecting portions that extend beyond the bicycle post so that a fastener through the projecting portions can draw the jaws together and firmly around the seat post. Integral with the head end portion is an intermediate section which extends downwardly at an angle and this intermediate section is integral with a rearwardly extending main body section which is extends upwardly at an angle so as to be located directly over the rear tire of the bicycle. Extending between and integral with the various sections of the mud guard are integral gusset members which are strategically located to afford maximum strength and rigidity to the mud guard when it is installed and in use on a bicycle. Attached to the outer end of the main body section is a relatively short shock absorbing member made of yieldable or bendable material, preferably having a color that is different from that of the main body section. This member extends the length of the splash guard and is easily noticeable, but if inadvertently engaged, the extended member will flex and prevent increased stresses from being transmitted to its attachment jaws on the bicycle seat post.

Other objects, advantages and features of the invention will become apparent from the following detailed description of one embodiment thereof, presented in conjunction with the accompanying drawing.

BRIEF DESCRIPTION OF THE DRAWING

FIG. 1 is a view in perspective of a mud guard embodying features of the invention as it appears when mounted on a typical bicycle, shown in phantom.

FIG. 2 is a side view in elevation of the mud guard of FIG. 1.

FIG. 3 is a top view of the mud guard of FIG. 1 showing the attachment means in its closed position.

FIG. 4 is a bottom view of the mud guard of FIG. 1 including an exploded view of elements comprising the attachment means.

FIG. 5 is an enlarged, exploded view in section taken at line 5—5 of FIG. 4 showing the main body of the mud guard and attachment means for the shock absorbing member.

DETAILED DESCRIPTION OF EMBODIMENT

With reference to the drawing, FIG. 1 shows a mud guard 10 embodying principles of the present invention as it appears when attached to a cylindrical post 12 for a seat 14 of a typical bicycle. The mud guard 10 is anchored firmly to the seat post so that it extends rearwardly over the rear bicycle wheel 16 and prevents mud, dirt and/or water from splashing upwardly toward the rider. At its outer end the mud guard 10 has a yieldable, bendable extension 18 which serves as a shock absorber and prevents excessive stress on the inner end of mud guard where it is attached to the bicycle seat post.

As shown, the mud guard 10 has a one piece main body 20 which is preferably molded from a durable high impact plastic material such as polypropylene. A head end portion 22 of the main body is shaped to form a pair of jaw projections 24, each of which extends from a semi-cyclindrical portion 26 having a diameter slightly larger than the bicycle seat post 12. The jaw projections 24 have inner faces 28 that are generally parallel and spaced apart and transversely aligned holes 30 are provided in the projection for receiving a suitable fastener 32. When the fastener is extended through the holes 30 the jaw projections 24 can be forced together so that the semi-cyclindrical portions 26 will firmly grip the seat post.

For fastening the mud guard to a bicycle seat post, it is preferred to use a toggle clamp fastener 32, as shown in FIGS. 3 and 4. This toggle clamp fastener, which enables the mud guard 10 to be attached and/or released rapidly, is comprised of an elongated bolt 34 which is threaded at its outer end and pivotally connected at its inner end by a roll pin 36 to a channel shaped latch body 37. The bolt 34 fits through the aligned holes 30 of the jaw projections 24 on the mud guard 10 and is secured by a nut 38 which is retained in the hole 30 of one jaw projection. The channel body 37 is shaped with an enlarged end portion 40, so that when it pivots on the bolt 34, it provides a camming action that forces the jaw projections 24 of the mud guard together to a closed postion, thereby causing the semicylindrical jaw positions 26 to grip the bicycle seat post 12.

Integral with the head end portion 22 of the main body of the mud guard 10 as shown in FIGS. 1 and 2, is an intermediate section 42 that slants rearwardly and downwardly and is integral with an elongated rear body section 44 which slants upwardly and rearwardly over the bicycle tire. As shown in FIG. 1-4, the rear body section 44 which is over twice as long as the intermediate section 42, has a constant camber along its length. This camber provides increased strength and rigidity and also serves to conform somewhat with the tire shape. To provide increased strength and rigidity to the mud guard, outer flanges 46 are provided on opposite sides of the head end portion which extend along the intermediate section to the rear body section. Also, as shown in FIG. 3, at the junction between the head end portion 22 and the intermediate section 42 a pair of integral, spaced apart, gusset-like webs 48 are provided to furnish additional strength and rigidity for the mud guard 10. As shown in FIG. 4, a similar but longer pair of strengthening gussetts 50 are provided in the underside of the mud guard 10 which extend from the head end position into the intermediate section 42. A longitudinal slot 52 is provided in the intermediate section 42 to accommodate a mount for a reflector (not shown).

The yieldable extension member 18 provides a shock absorbing end portion for the outer end of mud guard which helps to reduce any excessive stress on the front end fastener means 32 if the outer end of the cantilevered mud guard should be inadvertently hit or engaged by an extraneous force. As shown in FIGS. 3-5, this extension member has a relatively thin tongue portion 54 which overlaps and fits under an outer end portion of the rear body section 42. Provided on the underside of the tongue portion 54 are a pair of spaced apart, cylindrical bosses 56 each having an opening 58 in their top surface. When the extension member 18 is properly positioned at the end of the mud guard 10, with its tongue portion overlapping the adjacent mud guard end portion, the bosses 56 are aligned with and fit over a pair of smaller, integral bosses 60 on the underside of the mud guard's rear body section. Each of the bosses 60 has a threaded female insert 62. Thus, when the extension member 18 is positioned with its bosses 56 covering the bosses 60, a pair of short machine screws 64 can be used to secure the extension member 18 in place.

Aside from its shock absorbing ability, the extension member 18 which can be molded from flexible rubber-like material in various colors, may also function to make the mud guard more noticeable to other bicycle riders and less subject to inadvertant contact, as well as having a decorative effect. If desired, extension members of different colors can be easily removed and interchanged on the rear end of the main body section of the mud guard.

With the main body 20 molded as a one-piece unit, and the rear end extension member 18 attached, the mud guard 10 may be extremely light (e.g.five ounces), and yet it is strong and rigid so as to stop any mud and dirt particles that may be thrown up by the bicycle's rear tire. The single fastener attachment 28 to the bicycle on the seat post 12 is easy to manipulate and adjust, and since the mud guard 10 is cantilevered from the seat post, no attachments to the wheel hub are required. In addition, the flexible extension member provides for shock absorption against inadvertent forces which may be applied to the outer end of the mud guard.

To those skilled in the art to which this invention relates, many changes in construction and widely differing embodiments and applications of the invention will make themselves known without departing from the spirit and scope of the invention. The disclosure and the description herein are purely illustrative and are not intended to be in any sense limiting.

What is claimed is:

1. A mud guard for a bicycle having a frame including a cylindrical seat post attached to said frame and a pair of front and rear wheels supported by said frame, said mud guard comprising:
   an elongated unitary body of relatively rigid material adapted to attach to and cantilever rearwardly from said seat post over said rear wheel, said body having a forward section comprising a pair of spaced apart, bendable jaw portions, each said jaw portion being adapted to extend around one side of said seat post and having a radially projecting portion and fastener means for drawing said projecting portions together to clamp said jaw portions firmly on said seat post;
   an intermediate section of said unitary body having an upper end connected to said forward section and sloping downwardly and rearwardly to a lower end from said forward section;
   an integral outer body section having a width greater than the rear wheel of the bicycle so as to deflect any mud therefrom, said outer body being longer than said intermediate section and connected to said lower end of said intermediate section and sloping upwardly therefrom and rearwardly above the rear wheel of the bicycle, and
   an outer end member of relatively flexible material fixed to and projecting substantially co-planar with said outer body section for extending the length thereof and providing a yieldable outer end means capable of absorbing an impact without transmitting excessive stress to said jaw portions which would affect the grip of said forward body section on the seat post.

2. The mud guard of claim 1 wherein said forward, intermediate and outer body sections are formed as an integral molded unit from a rigid plastic material and said outer end member is made from a yieldable rubber-like material.

3. The mud guard of claim 1 wherein said outer end member has a different contrasting color from that of said unitary body.

4. The mud guard of claim 1 wherein said outer end member includes a flange portion which fits underneath an outer end portion of the outer body section, and fastener means for connecting said flange member to said body end member.

5. The mud guard of claim 4 including a pair of spaced apart bosses, each with an embedded female screw socket on the underside of said outer body section, and spaced apart openings on said flange of said outer end member for receiving fasteners which fit into said screw sockets.

* * * * *